COLOR INFORMATION PRESENTATION SYSTEM

Filed Aug. 16, 1956

2 Sheets-Sheet 1

Inventor:
Ferd E. Williams,
by Paul A. Frank
His Attorney.

March 15, 1960 F. E. WILLIAMS 2,928,980

COLOR INFORMATION PRESENTATION SYSTEM

Filed Aug. 16, 1956

2 Sheets-Sheet 2

Inventor:
Ferd E. Williams,
by Paul A. Frank
His Attorney.

2,928,980

COLOR INFORMATION PRESENTATION SYSTEM

Ferd E. Williams, Scotia, N.Y., assignor to General Electric Company, a corporation of New York Application August 16, 1956, Serial No. 604,424

3 Claims. (Cl. 315—10)

Figure 3:
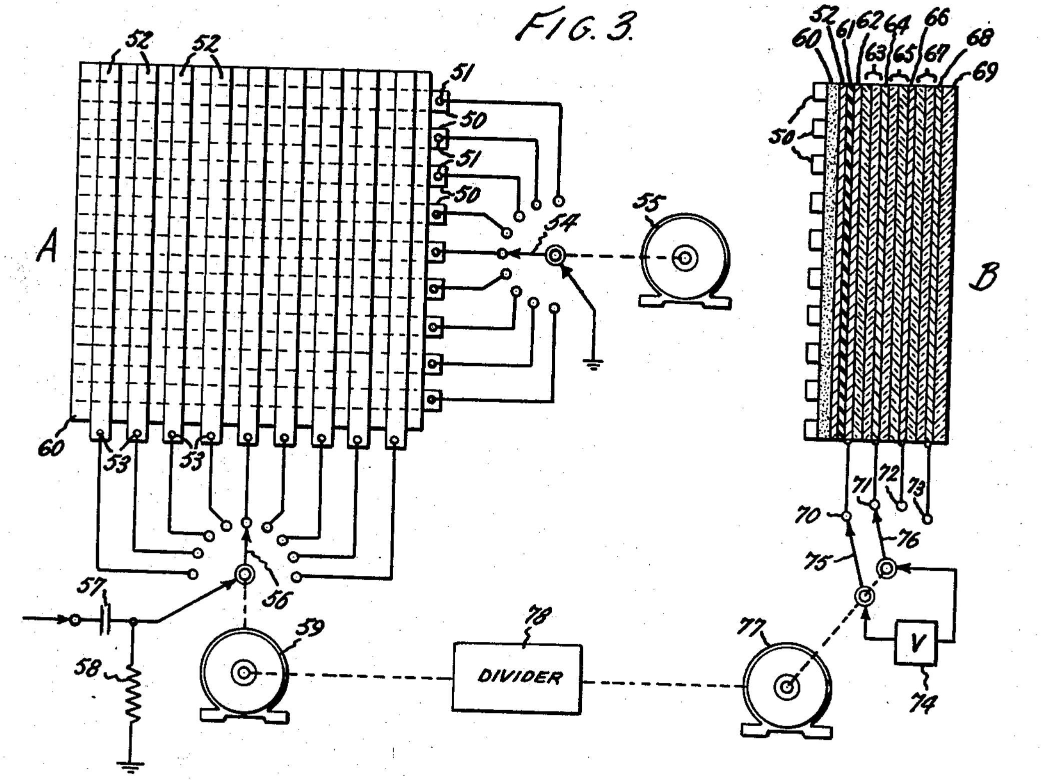

The present invention relates to improved information portraying systems and to screens therefor. More particularly, the invention relates to information portraying systems and screens therefor uniquely adapted to present high brightness information when supplied with low intensity signals.

In the television arts, particularly in the art of color television, presently available information presentation systems contain complicated and expensive components for obtaining high brightness images. Thus, for example, it has been found that in order to obtain television images of sufficient brightness and definitions, high potentials ranging up to 15,000 and 20,000 volts must be utilized for the acceleration of an electron beam which excites a televsion picture tube screen to luminescence. These high voltages require expensive circuitry for their production and are inherently dangerous. A further appreciation of the complexity of television presentation systems and screens may be gained from a consideration of the fact that present color television picture tubes of a line-sequential type require phosphor screens having 500 parallel lines of each of the three different color emitting phosphors used, or a total of 1500 phosphor lines upon the face plate of each tube. Television presentation tubes of the dot sequential type require a phosphor screen having approximately ¾ million phosphor dots, and a mask, interposed between the screen and the source of electrons, which has approximately ¼ million apertures therein. Obviously, preparation of such tubes is a highly complicated and expensive operation.

Similar problems are also present in radar presentation systems, which, in general, require extremely high voltages for the production of intelligible visual signals. Additionally, the intensity of images obtainable from the present day radar presentation systems is much lower than that obtainable in television systems. Furthermore, there has heretofore been no practical system developed for the presentation of radar images in color, which would permit a greater amount of intelligence to be transmitted.

Accordingly, one object of the invention is to provide color television presentation systems which are operable to produce high brightness images utilizing low voltage excitation without the necessity of utilizing highly complicated and expensive circuits therefor.

A further object of the invention is to provide information portraying screens for color television and radar systems wherein a low intensity visual signal is first produced and then amplified by individual light amplifying phosphor cells into a three-color information portrayal.

A further object of the invention is to provide color television and radar presentation screens utilizing electroluminescent-photoconducting light amplifying cells.

In accord with one embodiment of the invention I provide a color image presentation system having a presentation screen assembly including a first phosphor screen stimulable to emit ultra-violet or visible light by the excitation of cathode rays or the application of an electric field thereto. In close proximity to, and subjected to the emission of the first phosphor screen, I provide a composite color light amplifying phosphor screen having three light amplifying cells each of which comprises a layer of photoconductive material and a layer of electroluminescent material each of which is responsive to the emission of the first phosphor screen to emit a different color when simultaneously subjected to an electric field. Means are also provided to apply an electric field to each of the light amplifying cells in synchronization with the presentation of the image upon the first phosphor layer in frame, line, or dot sequential systems. The information impressed upon the amplifying cells is transmitted thereby into a color image presentation of high brightness which is ideally adapted for color television and color radar applications. In the systems of the invention the energy which is responsible for the production of high brightness color images is derived from the electric field impressed upon the light amplifying cells, rather than from the source which impresses information upon the screen. Because of this arrangement high brightness images are attained without the necessity of utilizing objectionably high potentials necessary in present day color television and radar presentation systems.

Figures 1, 4:
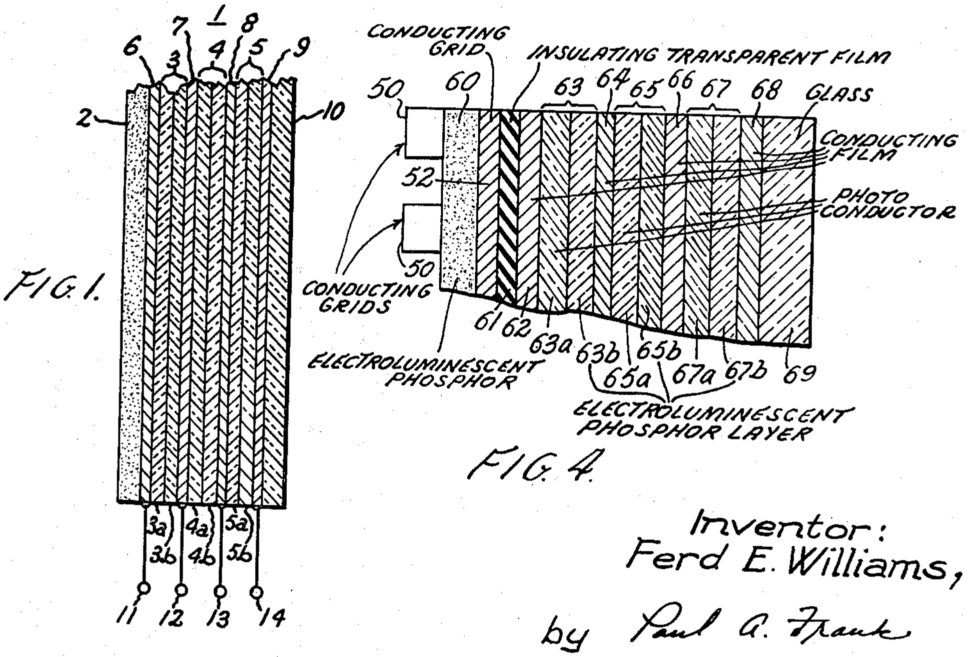

The novel features believed characteristic of the invention are set forth in the appended claims. The invention itself, together with further objects and advantages thereof, may best be understood with reference to the following description taken in conjunction with the attached drawings in which:

Figure 1 is a vertical cross-sectional view of a color presentation intensifying screen constructed in accord with one embodiment of the invention.

Figures 2A, 2B:
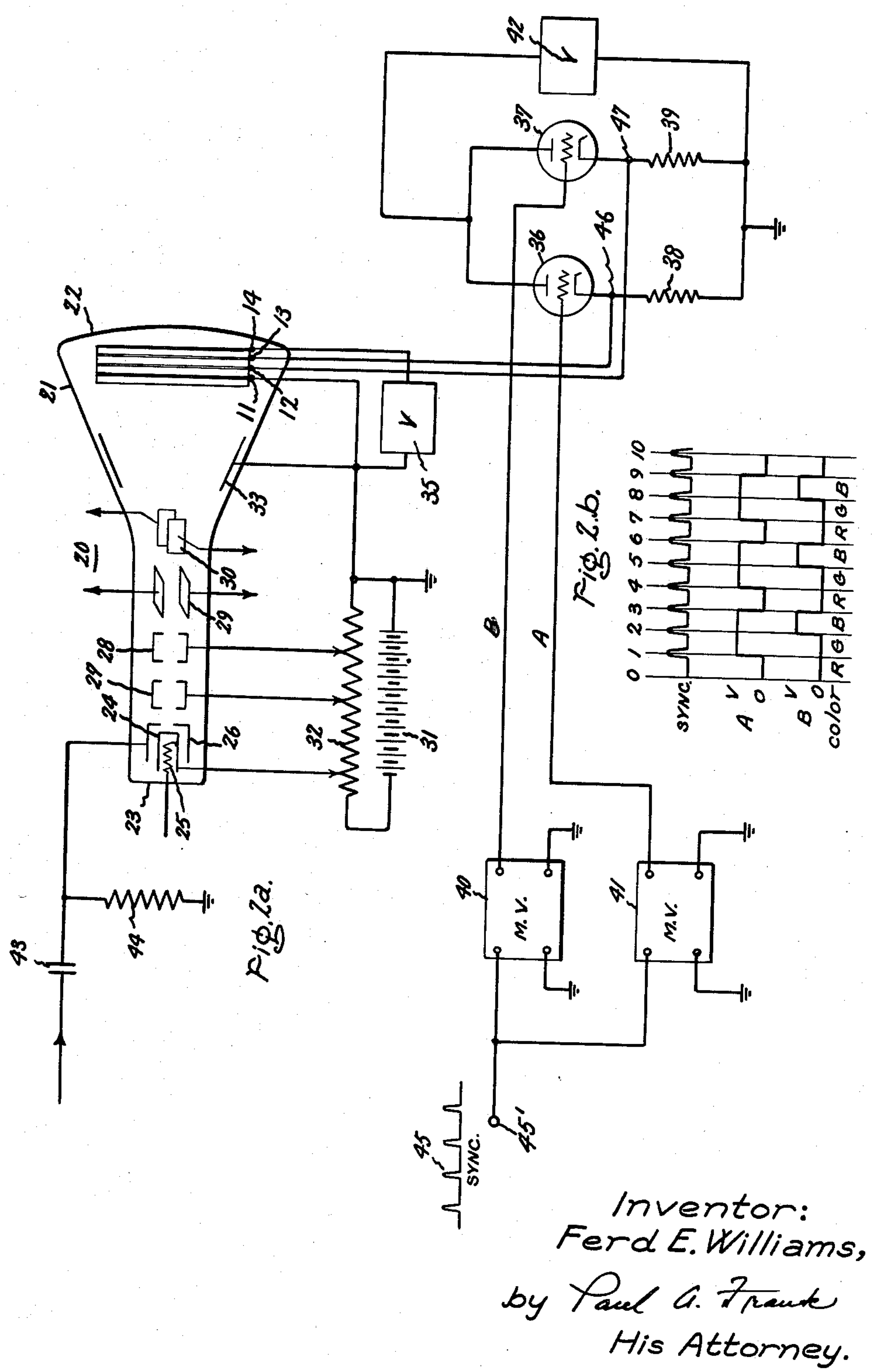

Figure 2*a* is a schematic diagram of a color cathode-ray projection tube including the screen of Figure 1 and switching circuits therefor.

Figure 2*b* is a graphical representation of voltage wave forms at the output and input terminals of the multivibrator stages of Figure 2*a*, and Figure 3 represents schematically an alternative embodiment of the invention in which the image presentation system of the invention includes a crossed-grid type phosphor screen. Fig. 4 is an enlarged cross-sectional view of a portion of section *b* of Figure 3.

Figure 1 of the drawing illustrates a color television presentation screen 1 constructed in accord with one aspect of the invention and adapted to be utilized as the face plate of a color television tube. Image presentation screen 1 comprises a layer 2 of a phosphor which emits visible or ultra-violet light when excited by cathode rays. Phosphor layer 1 is positioned in close relationship with three light amplifying cells 3, 4 and 5 respectively, each of which comprises a layer of photosensitive material 3*a*, 4*a*, 5*a* and a layer of electroluminescent material 3*b*, 4*b* and 5*b*. Each of light amplifying phosphor cells 3, 4, and 5 is sensitive to and excited by the emission of layer 1 and when so excited and an electric field is simultaneously impressed thereupon emits a different color of visible light. Light amplifying phosphor cell 3 is disposed in plane-parallel relation between transparent conducting films 6 and 7. Cell 4 is disposed in plane-parallel relationship between transparent conducting films 7 and 8 and cell 5 is disposed in plane-parallel relationship between transparent conducting films 8 and 9. The composite screen including phosphor layer 2 and light amplifying cells 3, 4 and 5 is mounted or deposited upon a transparent insulating base plate 10 which may be the face plate of a cathode ray tube, or which may be disposed in close proximity thereto.

Cathodoluminescent phosphor layer 2 may be any suitable cathodoluminescent phosphor which when excited by cathode rays emits ultra-violet or visible light. Since a great number of such phosphors are well known to the art, a recitation of all the suitable phosphors is believed unnecessary, however, layer 2 may, for example, be composed of aluminum oxide crystals suspended in a suitable binder such as potassium silicate, or a zinc sulfide phosphor activated with approximately 0.01% to 0.1% by weight of silver, similarly bound.

Light amplifying cells 3, 4 and 5 each comprise a layer of a photoconductive material and a layer of an electroluminescent material disposed between a pair of transparent conducting films. Light amplification is attained in these cells in substantially the following manner. Initially an electrical potential is applied between the transparent conducting films including the cell as, for instance, between films 6 and 7 enclosing light amplifying cell 3. With no information pattern impressed upon the light amplifying cell the field distribution therein is such that the voltage developed across the electroluminescent layer is insufficient to cause electroluminescence to occur, with the consequent emission of light. This is because the unilluminated photoconductive layer 3*a* has a high resistance and decreases the voltage which is developed across electroluminescent layer 3*b*. When, however, radiant energy, as for instance, the emission of cathodoluminescent phosphor screen 2, falls upon the light amplifying cell 3 and illuminates photoconductive layer 3*a*, the resistance of the illuminated portions of layer 3*a* decreases markedly and the voltage impressed upon the corresponding and contiguous portion of electroluminescent layer 3*b* is correspondingly increased, causing the emission of light therefrom by electroluminescence. The light emitted by electroluminescent layer 3*b* is found to be of greater intensity than the light falling upon photoconductive layer 3*a*, thus resulting in amplification of the visual signal. As mentioned hereinbefore, each of the electroluminescent layers of the respective light amplifying cells are chosen to emit a different color when stimulated.

Photoconducting layers 3*a*, 4*a* and 5*a* may be any material the resistivity of which undergoes a marked change with the incidence of visible light emitted by cathodoluminescent phosphor 2. Although a number of such materials are well known to the art, photoconductive layers may conveniently comprise the sulfides, selenides or tellurides of zinc, cadmium or lead. These layers are, however, preferably of cadmium sulfide. The physical form of the photoconductive layers is not critical. Thus, for example, the photoconductive layers may comprise microcrystalline layers of photoconductive material suspended in a suitable dielectric, or single crystals of the photoconductive material arranged in a mosaic. These materials are, however, preferably thin transparent films of cadmium sulfide prepared in accord with the method disclosed and claimed in application Serial No. 525,159 of D. A. Cusano filed July 29, 1955, now abandoned and assigned to the same assignee as the present application. In accord with this method, transparent photoconductive layers of cadmium sulfide are prepared by the vapor reaction of vapors of cadmium and an atmosphere of hydrogen sulfide gas at a pressure of 100 to 5000 microns of mercury which results in the deposition of a continuous, transparent, crystalline film of cadmium sulfide upon a heated substrate of an insulating material, as for example glass, maintained at a temperature of approximately 500 to 650° C.

Electroluminescent layers 3*b*, 4*b* and 5*b* may comprise any of the well known electroluminescent phosphors which may be properly chosen to emit three different appropriate colors. As an example of such a choice of three suitable phosphors for this purpose, layer 3*b* may conveniently be chosen to emit red light and may comprise zinc sulfide activated with approximately 0.3 weight percent of copper and fired in pure hydrogen sulfide. Layer 4*b* may conveniently be chosen to emit green light and may comprise zinc sulfide activated with approximately 0.01 weight percent copper and fired in an atmosphere of hydrogen sulfide and hydrogen chloride. Layer 5*b* may conveniently be chosen to emit blue light and may comprise zinc sulfide activated with 0.1 weight percent of copper and fired in an atmosphere of hydrogen sulfide and hydrogen chloride. The physical structure of electroluminescent layers 3*b*, 4*b* and 5*b* may be that of a mass of microcrystals suspended in a suitable dielectric, a mosaic of properly oriented single crystals, or a continuous vapor deposited layer of phosphor material deposited in accord with the method described and claimed in U.S. Patent 2,675,331 to Cusano and Studer.

Transparent conducting films 6, 7, 8 and 9 may be thin transparent evaporated films, a fraction of a micron thick, of a metal such as aluminum or silver or a metal grid or mesh with appreciable transparency. Alternatively, these layers may be films of tin oxide, known in the art as "conducting glass" several microns thick. Preferably, however, these films comprise similarly thin films of titanium dioxide which may be produced in accord with the process described and claimed in Patent No. 2,732,313 to Cusano and Studer.

According to this method a thin film of titanium dioxide approximately 0.1 to 10 microns thick may be formed upon a suitable substrate such as glass, mica or quartz by causing titanium tetrachloride and water vapor to be intermixed in the vicinity of the substrate while it is maintained at a temperature of approximately 100 to 250° C. As deposited the titanium dioxide film is not conducting but may be rendered conductive by the subsequent deposition of a sulfide phosphor layer thereupon. Alternatively, the titanium dioxide layer may be rendered conducting with the process described and claimed in Patent No. 2,717,844 to L. R. Koller.

The composite presentation screen 1 of Figure 1 may be formed by first suspending an insulating base plate 10, which is transparent to visible light and which may, for example, be of glass, mica or quartz, and depositing thereupon a transparent titanium dioxide film 8 by the process described and claimed in the aforementioned Cusano and Studer Patent 2,732,313. Layer 5*b* of electroluminescent phosphor 4 is next deposited and may conveniently be formed upon film 9 by the process of the aforementioned Cusano and Studer Patent No. 2,675,331. A thin transparent photoconducting layer 5*a* may then be deposited upon layer 5*b* by vapor reaction technique of the aforementioned Cusano application Serial No. 525,159. A thin transparent film of titanium dioxide 8 is then deposited thereupon by the process of the aforementioned Cusano and Studer Patent 2,732,313. The processes of depositing electroluminescent layers, photoconducting layers, and titanium dioxide films are alternately carried out until films 4*b*, 4*a*, 7, 3*b*, 3*a*, and 6 are formed. Cathodoluminescent phosphor layer 2 is then deposited upon transparent conducting film 6 by conventional spraying or liquid settling techniques, well known to the art, or by the vapor deposition process of the Cusano and Studer Patent No. 2,675,331. As noted hereinbefore, phosphor layer 2 is one which emits ultra-violet or blue radiation when stimulated. For the purposes of this specification and the appended claims this emission is meant to include electromagnetic radiation having a wavelength from 3200 to 4600 A.U.

The composite screen as illustrated in Figure 1 may then be incorporated as a face plate of a cathode ray tube, appropriate connections 11, 12, 13 and 14 being made to transparent conducting electrodes 6, 7, 8 and 9 respectively. Alternatively, after these connections have been made, the entire assembly may be mounted in close juxtaposition to the face plate of a cathode ray television or radar projection tube. Although, in Figure 1, the screen has been illustrated as being flat, it is obvious that the screen may be made with any appropriate curvature as is conventional in the manufacture of projection tubes.

Figure 2*a* illustrates, in schematic, a cathode ray projection tube, including the screen of Figure 1 and appropriate circuits for the operation thereof. In Figure 2, cathode ray tube 20 includes a conical portion 21 having a face plate 22 and a neck portion 23. Within neck portion 23 are located a cathode 24, a heater 25, a control electrode 26, and accelerating electrodes 27 and 28. Immediately following the accelerating electrodes are a pair of vertical electrostatic deflection plates 29 and a pair of horizontal electrostatic deflection plates 30. Alternatively, rather than utilizing electrostatic deflection plates 29 and 30, electromagnetic deflection yokes may be utilized, since the characteristics of the electron gun of tube 20 are not critical. Operating potentials for the operation of the tube 20 are supplied by a unidirectional voltage source represented generally by battery 31 shunted with a voltage dividing resistor 32. Appropriate taps for the cathode and accelerating electrodes of tube 20 are made to voltage dividing resistor 32 to supply the operating potentials thereto. The total voltage of source 31 is supplied to accelerating ring 33 and to terminal 11 of color screen 34, and therethrough, to conducting electrode 6 which serves as the anode of the cathode ray tube. While the potentials supplied to the electron gun electrodes are the same as those supplied to conventional electron guns, the accelerating potential applied to accelerating ring 33 and electrode 6 may be as low as 500 volts, as opposed to the conventional accelerating potentials of 15,000 to 20,000 volts, since the electron beam need only supply information to the screen, rather than supply both information and energy to portray the information as well, as is conventional.

A unidirectional or alternating voltage source represented generally at 35 is used to supply a potential V to electrodes 11, 12, 13 and 14 in order to cause one of different color emitting light amplifying cells 3, 4 and 5 to be energized in accord with the presentation of color information to the control electrodes 26 of tube 20. One terminal of voltage source 35 is connected to terminal 11 and the other terminal thereof is connected to terminal 14. This voltage is switched to apply an electric field across one only of the three light amplifying cells 3, 4 and 5, by means of cathode follower tubes 36 and 37 having respective cathode resistors 38 and 39 which tubes are, in turn, controlled by multivibrators 40 and 41. A source of operating potential for discharge devices 36 and 37 is represented generally at 42. Source 42 has a magnitude V equal to the magnitude of source 35, and may be either alternating or unidirectional, but must correspond in type to voltage source 35.

In the operation of the switching circuit, the input signals carrying the information to be portrayed visually by cathode ray tube 20 is applied to capacitor 43 and is developed across resistor 44. This signal is accompanied with a synchronizing pulse, represented at 45, which is supplied to terminal 45', a common input terminal to multivibrators 40 and 41, the other input terminal of each being grounded. Multivibrators 40 and 41 may be conventional free-running, synchronized multivibrators such as those described on page 512 et seq. of Terman's "Radio Engineers Handbook" published in 1943 by the McGraw Hill Book Company. The constants of the multivibrators are adjusted so that multivibrator 41, normally off, is triggered to the on condition by the first synchronizing pulse and triggered off by the third synchronizing pulse. It is again triggered on by the fourth synchronizing pulse and off by the sixth, as is represented by curve A of Figure 2*b* of the drawing. The constants of multivibrator 40 are adjusted so that the multivibrator, normally off, is switched on by the second synchronizing pulse and off by the third synchronizing pulse; on by the fifth synchronizing pulse and off by the sixth, as is represented by curve B of Figure 2*b* of the drawing. Cathode follower electron discharge devices 36 and 37 and the cathode resistors thereof, are selected, when conducting, to develop between ground and output terminals 46 and 47 thereof a voltage equal to V, the voltage developed by source 35. This potential is supplied by voltage source 42 which supplies operating potential to tubes 36 and 37. Source 42 may be either unidirectional or alternating and corresponds in type to voltage source 35. Cathode follower 36 is adapted to be rendered conducting, and to produce a voltage V across cathode resistor 38, when multivibrator 41 is in the on condition. Likewise, cathode follower 37 is adapted to be maintained conducting and to develop a potential V across cathode resistor 39 when multivibrator 40 is in the conducting condition.

In the time interval elapsing between zero time and the arrival of the first synchronizing pulse to multivibrators 40 and 41, the potential V of voltage source 35 is applied between terminals 14, to which it is connected, and 13, which is maintained at ground potential through cathode resistor 38 of multivibrator 36, since resistor 38 is of much lower resistance than the resistance of light amplifying screens 3 and 4. The entire potential V is thus impressed across one light amplifying cell, the red emitting cell 5. Thus when cathodoluminescent phosphor layer 2 is irradiated by cathode rays so as to emit ultra-violet or visible light, red light is emitted from the composite screen. Upon the arrival of the first synchronizing pulse, as is indicated in Figure 2*b*, multivibrator 41 is triggered to the on condition, and consequently electron discharge device 36 is rendered conducting. A voltage V is developed across cathode resistor 38 and is applied to terminal 13. Since the voltage V is also applied to terminal 14 by battery 35, no electric field is developed across light amplifying cell 5, and the red emission thereof is extinguished. However, with terminal 12, and consequently transparent conducting film 8, maintained at ground potential through cathode resistor 39 of cathode follower 37, the voltage V is impressed across light amplifying cell 4. Thus, when cathodoluminescent phosphor 2 is excited by cathode rays and emits ultra-violet or visible light, green radiation of high brightness is emitted by light amplifying cell 4. Upon the arrival of the third synchronizing pulse, as is illustrated in Figure 2*b*, no change occurs in the condition of multivibrator 41. However, multivibrator 42 is then triggered to the on condition by the second synchronizing pulse, rendering electron discharge device 37 conducting, and causing a voltage V to be developed across cathode resistor 39 thereof. The voltage V is then impressed upon transparent conducting film 7 through terminal 12. Since the voltage V is now applied to conducting films 7, 8 and 9, no electric field is developed across light amplifying cells 4 and 5 and the green and red emission thereof is effectively quenched. However, since the potential V is impressed across the light amplifying cell 3 through terminals 11 and 12, blue emission is emitted therefrom when cathodoluminescent film 2 emits ultra-violet or visible light.

In accord with the foregoing description it may be seen that the information portraying screen of the invention is so arranged that three light amplifying cells are juxtaposed in close relationship with the ultra-violet or visible light emitting cathodoluminescent layer of the screen, each of the light amplifying cells emitting a different color when irradiated by the emission of the cathodoluminescent layer and when an electric field either alternating or unidirectional is simultaneously impressed thereupon. The electric field is impressed upon each of the light amplifying cells in synchronism with the application of the corresponding color information signal to the control electrode of the cathode ray tube. Thus, when the signal containing the red information is impressed upon the control electrode of the cathode ray tube and transmitted to the electron beam generated therein, the light amplifying cell which emits red light has an electric field impressed thereupon and, no field is impressed upon the other two light amplifying cells. Conversely, when a blue or green signal is received on the control electrode of the cathode ray tube, either the blue or green light amplifying cell, respectively, and exclusively, has an electric field impressed thereupon.

In this embodiment of the invention the actual energy which causes high brightness light emission from the screen of the invention comes from the electric field impressed upon the light amplifying cells. The electron beam generated within the cathode ray tube need only have sufficient energy to transmit information to cathodoluminescent phosphor layer 2. The systems of the invention are operative to produce high brightness images with cathode ray accelerating voltages of as low as 500 volts, as opposed to the 15,000 to 20,000 volts utilized in conventional systems. Typical systems may operate with accelerating potentials of 500 to 1000 volts. Although the information portraying screen of the invention is ideally suited for application with a frame sequential television presentation system, it is also well adapted for line or dot sequential presentation systems. Additionally, although the invention is described with reference to three component color systems it is apparent that, with properly chosen phosphors, and the use of only two light amplifying cells, the invention may be utilized in a two component color presentation system.

In accord with a further embodiment of the invention, the light amplifying cells of the invention may be incorporated with a crossed-grid image presentation system to secure a high brightness color information portrayal therefrom. A crossed-grid type information portraying screen is described and claimed in U.S. Patent No. 2,698,915 to W. W. Piper. The incorporation of such an information portrayal system in accord with the invention is illustrated in Figure 3 of the drawing. In Figure 3*a*, the crossed-grid screw is shown in plan view, and in Figure 3*b*, the screw is shown in vertical cross-section. In Figure 3*a*, a first set of horizontal electrode members 50, each having a terminal connection 51 thereto, are disposed on one side of a layer 60 of phosphor which emits ultra-violet or visible light when excited by an electric field. A second set of vertical, parallel, grid-like electrode members 52 are disposed on the opposite surface of electroluminescent phosphor layer 60. The grids are arranged so that the members of one grid are substantially perpendicular to the members of the other grid. A first switch means 54 is adapted to alternately connect one of the horizontal grid members to ground potential, and is driven by a source of energy conventionally represented as electric motor 55. A second switch means 56 is connected to alternately connect an input signal, impressed through condenser 57 across resistor 58, to a single vertical electrode member 52 by means of vertical electrode terminals 53. Second switch means 56 is driven by a source of power conventionally represented as motor 59. Both motors 55 and 58 and switches 54 and 56 may be replaced by any functionally equivalent electronic circuit such as, for instance, delay lines, binary counting units, or a system wherein terminals 53 and 51 are scanned by two respective electron beams which form electrically conducting paths to connect terminals 51 to ground potential and terminals 53 to the input signals.

In Figure 3*b* the composite information portrayal screen is represented in vertical cross-section. Horizontal electrode members 50 are juxtaposed on one side of electroluminescent phosphor layer 60 which may, for example, be a matrix of single crystals or a vapor deposited phosphor prepared in accord with U.S. Patent No. 2,675,331 to Cusano and Studer. This phosphor may be any electroluminescent phosphor which emits ultra-violet or visible light and may conveniently be zinc sulfide activated with 0.01% by weight of silver. Vertical electrode elements 52 contact the opposite major surface of phosphor layer 60. Immediately adjacent vertical electrode members 52 is a thin insulating, light transparent film 61 which may, for example, be an unreduced titanium dioxide film. Next to insulating film 61 is a transparent conducting layer 62 which may be any of the transparent conducting layers described with respect to the embodiment of Figure 1 of the invention. Immediately next to the transparent conducting electrode 62 there is located, in succession, a first light amplifying cell 63, a second transparent conducting electrode 64, a second light amplifying cell 65, a third transparent conducting electrode 66, a third light amplifying cell 67, and a fourth transparent conducting electrode 68. As with the light amplifying cells of the first described embodiment of the invention, each light amplifying cell comprises a photoconducting layer and an electroluminescent layer. Thus, for example, light amplifying cell 63 comprises photoconducting layer **63*a* and electroluminescent layer 63*b*. The photoconducting layers may be any of the materials mentioned with respect to the first described embodiment of the invention and may be prepared in like manner. The electroluminescent layers may be single crystalline or continuous vapor deposited layers as described with respect to the first described embodiment of the invention and may be prepared in like manner. Terminals 70, 71, 72, and 73 are made to transparent conducting electrodes 62, 64, 66 and 68**, respectively.

A source of electrical potential supplying a unidirectional or alternating potential of from 10 to 100 volts and represented generally by voltage source 74 is connected between switch contact members 75 and 76 which are rotated mechanically or electronically, as with the switching system described with respect to Figure 2, by a source of switching energy represented conventionally as electric motor 77. The speed of electrical motor 77 is synchronized with, and reduced from, the speed of electric motor 59 by a conventional electronic divider circuit 78 which reduces the frequency of switching members 75 and 76 from the frequency of switching of switch member 56 by the proper ratio depending upon whether the presentation is presented in a frame, line, or dot sequential system. Since electronic frequency dividers are conventional and well known to the art this element is shown in block form.

The screen of this embodiment of the invention functions in accord with the teachings set forth in the aforementioned Piper Patent 2,698,915. The phosphor region at the particular intersection of horizontal and vertical grid elements is excited to electroluminescence when the two respective elements are switched by switching means 54 and 56 so as to form a completed circuit between input signal and ground. The remaining areas of the screen remain unexcited. A raster is then scanned by the operation of switch motors 55 and 59, and, in sequence therewith, the voltage is switched on the light amplifying cells so that when a red signal is applied to capacitor 57 and across resistor 58 causing the excitation of a portion of the crossed-grid screen, an electric field is impressed upon the red emitting light amplifying cell. Likewise, when the blue or green signals, respectively, are applied to the crossed-grid screen an electrical potential is applied across the blue or green emitting light amplifying cell. Thus a three primary color image is emitted by the composite screen of the invention. As with the previously discussed embodiment of the invention this embodiment may also be utilized in a two component color system by the use of two properly selected light amplifying phosphor cells only.

While the invention has been described with respect to certain embodiments thereof it is obvious that many changes and modifications will immediately occur to those skilled in the art. Accordingly, I intend, by the appended claims, to cover all such changes and modifications as fall within the true spirit and scope of the foregoing disclosure.

What I claim as new and desire to secure by Letters Patent of the United States is:

1. A color image presentation system comprising: a composite screen including in directly contacting superposed relation a first phosphor layer, said layer being composed of a luminescent material which when excited to luminescence emits radiation in the region consisting of the ultra violet spectrum and the visible spectrum; a plurality of light amplifying phosphor cells each of which emits a different primary color emission when simultaneously excited by the emission of said first phosphor layer and an electric field, and including contiguous layers of a photoconductive material and an electroluminescent phosphor; a plurality of transparent conducting films deposited between adjacent light amplifying cells; a source of luminescence-enhancing electric potential; and switching means alternatively and sequentially applying an electric field across one only of said light amplifying cells in synchronism with an applied signal to cause said cell to emit its characteristic radiation when so excited.

2. A color cathode ray tube comprising: a conical information presentation portion including: a face plate; a neck portion having therein means for generating; focusing and deflecting an electron beam so as to form a raster pattern; and an information portraying screen located adjacent said face plate so as to intercept said raster pattern and including a transparent base plate, a first transparent conducting film deposited upon said base plate, a first light amplifying cell deposited upon said first conducting film and including contiguous layers of a photoconductive material and an electroluminescent phosphor which when excited emits a first primary color, a second transparent conducting film deposited on said first light amplifying cell, a second light amplifying cell deposited on said second conducting film and including contiguous layers of a photoconductive material and an electroluminescent phosphor which when excited emits a second primary color, a third transparent conducting film deposited on said second light amplifying cell, a third light amplifying cell deposited on said third transparent conducting film and including contiguous layers of a photoconductive material and an electroluminescent phosphor which when excited emits a third primary color, a fourth transparent conducting film deposited on said third light amplifying cell, a cathodoluminescent phosphor layer deposited on said fourth transparent conducting film and emitting radiation in the region consisting of the ultra violet spectrum and the visible spectrum when excited to luminescence: a source of luminescence enhancing electric potential and contact means to each of said transparent conducting films providing means for applying a luminescence enhancing electric field across each of said light amplifying cells alternately to cause said cells to each emit their characteristic radiation when so excited.

3. A color cathode ray tube comprising: a conical information presentation portion including: a face plate; a neck portion having therein means for generating, focusing and deflecting an electron beam so as to form a raster pattern; and an information portraying screen located adjacent said face plate so as to intercept said raster pattern and including a transparent base plate, a first transparent conducting film deposited upon said base plate, a first light amplifying cell deposited upon said first conducting film and including alternate deposited layers of a photoconductive material and an electroluminescent phosphor which when excited emits a first primary color, a second transparent conducting film deposited on said first light amplifying cell, a second light amplifying cell deposited on said second conducting film and including alternate deposited layers of a photoconductive material and an electroluminescent phosphor which when excited emits a second primary color, a third transparent conducting film deposited on said second light amplifying cell, a third light amplifying cell deposited on said third transparent conducting film and including alternate deposited layers of a photoconductive material and an electroluminescent phosphor which when excited emits a third primary color, a fourth transparent conducting film deposited on said third light amplifying cell, a cathodoluminescent phosphor layer deposited on said fourth transparent conducting film and emitting radiation in the region consisting of the ultra violet spectrum and the visible spectrum when excited to luminescence: a source of luminescence enhancing electric potential and contact means to each of said transparent conducting films providing means for applying a luminescence enhancing electric field across each of said light amplifying cells alternately to cause said cells to each emit their characteristic radiation when so excited.

References Cited in the file of this patent

UNITED STATES PATENTS

| | | |
|---|---|---|
| 1,779,748 | Nicolson | Oct. 28, 1930 |
| 2,698,915 | Piper | Jan. 4, 1955 |
| 2,728,815 | Kalfaian | Dec. 27, 1955 |
| 2,730,644 | Michlin | Jan. 10, 1956 |
| 2,780,731 | Miller | Feb. 5, 1957 |
| 2,795,730 | Fromm | June 11, 1957 |

FOREIGN PATENTS

| | | |
|---|---|---|
| 157,101 | Australia | June 16, 1954 |